Jan. 21, 1964    W. H. McCAULEY    3,118,575
FEEDER FOR SOLID PARTICLES
Filed Dec. 19, 1960    2 Sheets-Sheet 1

WILLIAM H. McCAULEY
INVENTOR.

BY *Lyon + Lyon*

ATTORNEYS.

Jan. 21, 1964          W. H. McCAULEY          3,118,575
                   FEEDER FOR SOLID PARTICLES
Filed Dec. 19, 1960                          2 Sheets-Sheet 2

WILLIAM H. McCAULEY
INVENTOR.

BY

ATTORNEYS

United States Patent Office 3,118,575
Patented Jan. 21, 1964

3,118,575
FEEDER FOR SOLID PARTICLES
William H. McCauley, Alhambra, Calif., assignor to C. F. Braun & Co., Alhambra, Calif., a corporation of California
Filed Dec. 19, 1960, Ser. No. 76,633
12 Claims. (Cl. 222—349)

This invention relates to feeding apparatus for metering solid particles or granular material.

Conventional rotary feeders commonly employ a bladed rotor turning within a housing. A gravity flow of solid particles enters pockets formed between the rotor blades through an entrance opening in the housing and the solid particles are discharged by gravity through an outlet opening in the housing. Such conventional feeder devices fill each pocket on the rotor completely full and hence solid particles are sheared between the rotor blades and the walls of the housing. This shearing action increases the required torque input and requires strengthening and stiffening of the component parts of the device. Attempts have been made to reduce this objectionable torque by providing flexible blades or by canting the blades, or by providing for replaceable rotor blade tips. Furthermore, the shearing action in conventional feeders for solid particles may produce objectionable "smearing" and degradation of the product.

It is the principal object of this invention to overcome these shortcomings in conventional feeders for solid particles and to provide a novel form of apparatus controlling inlet to the moving pockets so that those which are directly below the inlet opening are not completely filled. In this way, searing is avoided and "smearing" or product degradation is substantially eliminated. A non-choking construction is provided which requires relatively low input energy and the device may readily be started or stopped when fully loaded.

Briefly stated, the objects of the invention are accomplished by employing one or more bridges or filler blocks in the feed opening, which bridges in operation create a void directly under each bridge due to the natural angle of repose of the solid particles. A feed opening scraper on the normally shearing side of the pocketed member is set at a clearance to prevent mechanical shearing of the particles, and accordingly the particles "slide" past each other. A cavity is provided downstream from each bridge, and spreading means are provided to move particles laterally into such cavity without interference. The lateral spreading means may comprise flexible edge members mounted at an angle and positioned downstream from the scraper. Other and more detailed objects will appear hereinafter.

Figure 1:
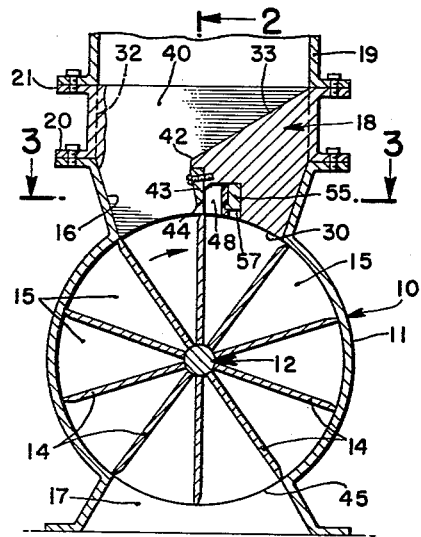
FIGURE 1 is a transverse sectional view showing a preferred embodiment of this invention.
Figure 2:
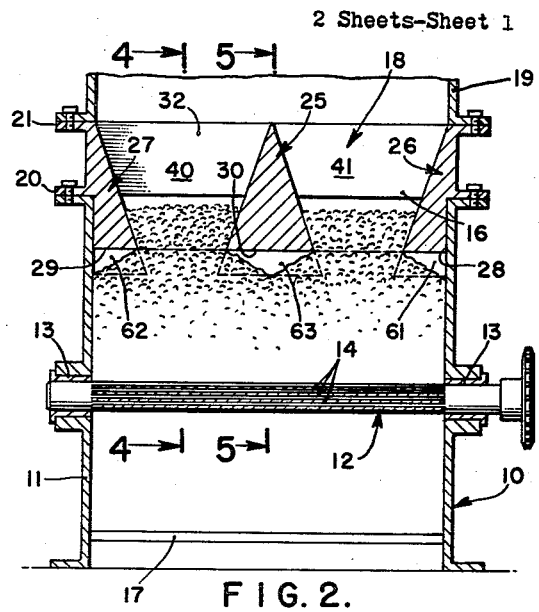
FIGURE 2 is a sectional elevation taken substantially on the lines 2—2 as shown in FIGURE 1.
Figure 4:
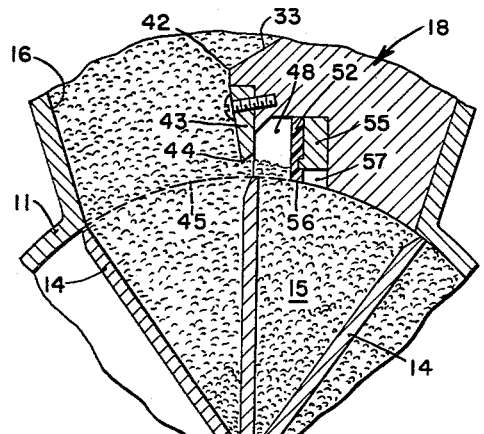
FIGURE 4 is a sectional elevation partly broken away taken substantially on lines 4—4 as shown in FIGURE 2.
Figure 5:
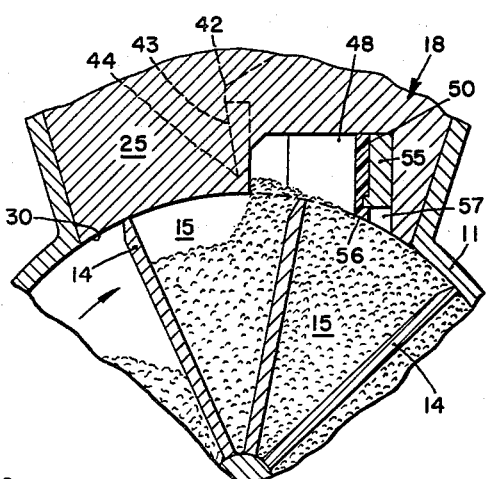
FIGURE 5 is a view similar to FIGURE 4 taken substantially on the lines 5—5 as shown in FIGURE 2.
Figure 3:
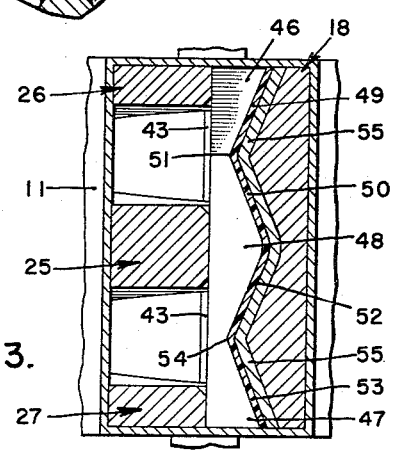
FIGURE 3 is a sectional detail taken substantially on the lines 3—3 as shown in FIGURE 1.
Figure 6:
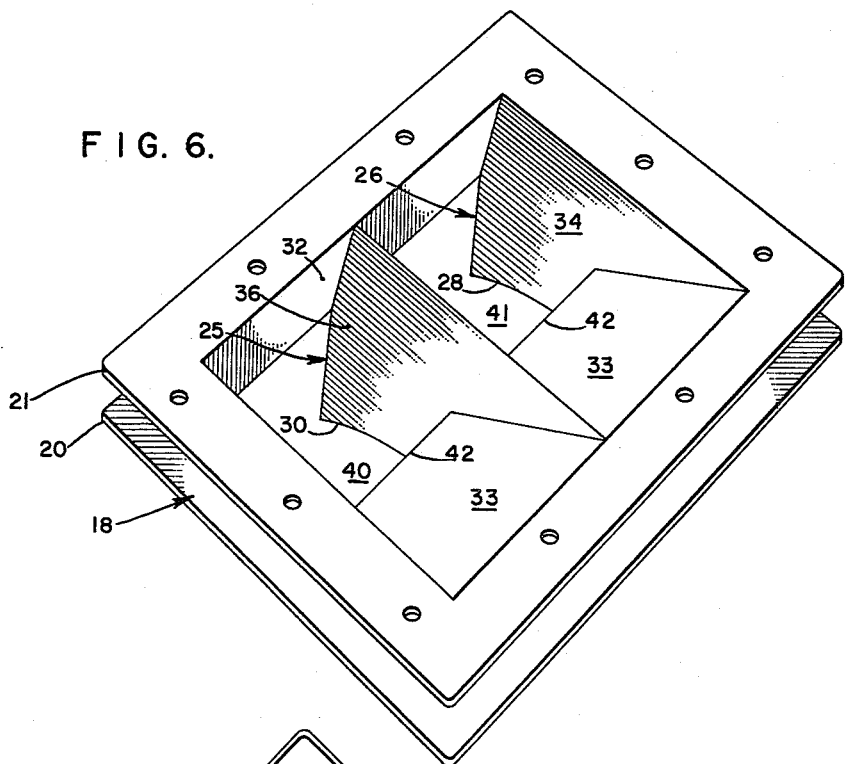
FIGURE 6 is a perspective view of the upper side of the distributor.
Figure 7:
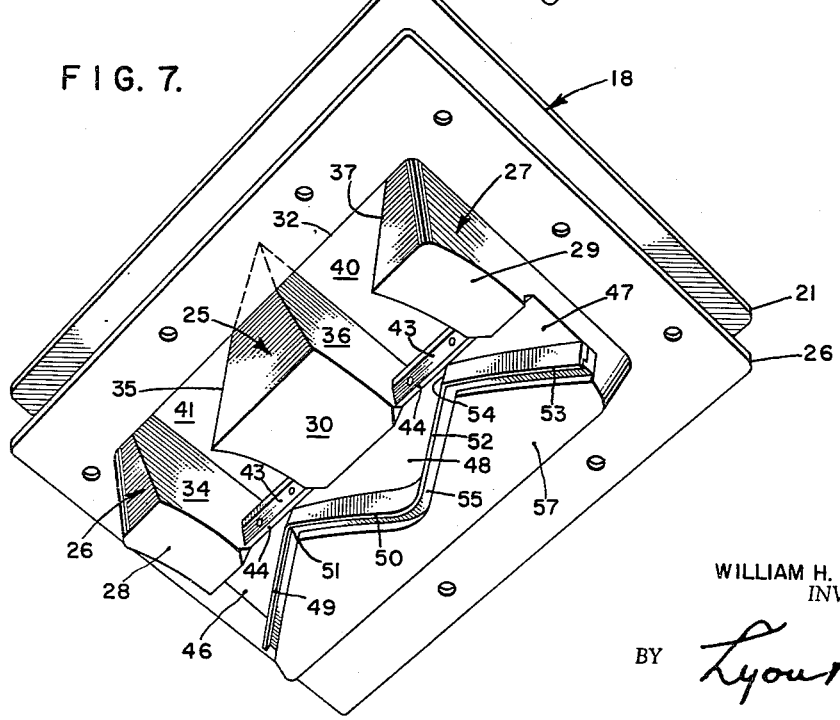
FIGURE 7 is a perspective view of the underside of the distributor.

Referring to the drawings, the rotary feeder device generally designated 10 includes a housing 11 having a rotor 12 mounted to turn therein. Bearings 13 support the rotor shaft on the housing 11. The rotor is provided with a plurality of radially extending blades 14 which define pockets 15 therebetween. The tip ends of the blades 14 have running clearance with inner surface of the housing 11.

The housing 11 has an inlet opening 16 through which solid particles may pass into the rotor pockets 15. The housing 11 also has a discharge opening 17 through which the solid particles may discharge by gravity from the rotor pockets 15.

In accordance with my invention, I provide a distributor generally designed 18 for controlling the flow of solid particles from the supply conduit 19 into the rotor pockets 15. The solid material may comprise any free flowing solids that do not become fluid when aerated. The particular form of device illustrated in the drawings has been found especially useful in metering the flow of polyolefin nibs or pellets.

The distributor 18 may be constructed as an integral part of the housing 11 or may be mounted as a separate attachment as shown in the drawings. The distributor is provided with flanged connections 20 and 21 and is interposed between the housing 11 and the feed conduit 19. The distributor is provided with a central bridge member 25 and a pair of end bridge members 26 and 27. The birdge members 26 and 27 are provided with curved lower surfaces 28 and 29 respectively, and the central bridge member 25 is provided with a curved lower surface 30. The curved surfaces 28, 29 and 30 have running clearance with the tip ends of the rotor blades 14. The distributor has transverse walls 32 and 33 cooperating with the inclined surfaces 34, 35, 36 and 37 on the bridge members to define a pair of feeding throats 40 and 41. The wall 33 is inclined downward and forward and the terminal portion 42 thereof provides a mounting support for transversely extending the scraper blades 43. These blades have a lower edge 44 spaced above the peripheral path 45 of the tips of the rotor blades 14. The edge 44 of the scraper blades 43 is also above the curved clearance surfaces 28, 29 and 30 of the bridge members 26, 27 and 25, respectively.

Behind each of the bridge members is a cavity formed in the distributor 18. Thus, behind bridge members 26 and 27 are cavities 46 and 47, respectively. The central cavity 48 is positioned behind the bridge member 25. Resilient angled edge members 49 and 50 meet at apex 51 directly behind one of the scraper blades 43. Similarly resilient angled edge members 52 and 53 meet at apex 54 directly behind the other scraper blade 43. Solid particles passing under the scraper blades 43 accordingly are divided at the apices and are spread laterally by the angled edge members into the pockets behind the bridge members. The angled edge members 49, 50, 52 and 53 may be formed of resilient material carried on metal backing plates 55 fixed to the distributor 18. The lower flexible lips 56 of these members allow solid particles to pass into the secondary cavities 57 behind these members and to distribute them laterally into the rotor pockets 15.

A flow of solid particles delivered through the supply conduit 19 divides into two streams as it enters the feeding throats 40 and 41. The rotor pockets 15 under these feeding throats are not completely filled because voids 61, 62 and 63 are formed beneath the bridge members 26, 27 and 25, respectively, by reason of the angle of repose of the solid particles. As the rotor 12 turns within the housing 11, solid particles are carried under the scraper blades 43 and into the cavities 46, 47 and 48 in the distributor 18 directly behind the bridge members. It will be observed that the lower forward edge of each of the bridge members 28, 29 and 30 has greater lateral width than the rearward lower edge thereof. The flexible angled edge members 49, 50, 52 and 53 divide the flows of solid material under the scrapers 43 and cause the particles to move laterally into the pockets 15 to fill the voids 61, 62 and 63. Any particles passing the flexible lower lips 56 enter the secondary cavities 57 and are spread laterally to fill the voids.

Having fully described my invention it is to be understood that I do not wish to be limited to the details set forth herein but my invention is of the full scope of the appended claims.

I claim:

1. In a feeder of the type described, the combination of: a housing having an entrance opening and a discharge opening, a member mounted to move in the housing and provided with laterally extending blades, the blades defining pockets therebetween adapted to receive solid particles from the entrance opening and to discharge them by gravity through said discharge opening, laterally spaced bridge members positioned in the entrance opening and reducing the width thereof, said bridge members having lower surfaces shaped for running clearance with respect to said blades, a downward and forward inclined wall extending between said bridge members and reducing the length of said entrance opening, a laterally extending scraper element on the lower portion of said wall spaced above said clearance surfaces of said bridge members, means forming cavities under said inclined wall at the rearward ends of said bridge members, whereby a flow of solid particles may pass between said bridge members and under said scraper element and laterally into said cavities.

2. The combination set forth in claim 1 including resilient spreader means at the forward ends of said cavities.

3. In a rotary feeder of the type described, the combination of: a housing having an entrance opening and a discharge opening, a rotor mounted to turn in the housing and provided with radially extending blades, the blades defining pockets therebetween adapted to receive solid particles from the entrance opening and to discharge them by gravity through said discharge opening, laterally spaced bridge members positioned in the entrance opening and reducing the width thereof, said bridge members having curved lower surfaces for running clearance with respect to said rotor blades, a downward and forward inclined wall extending between said bridge members and reducing the circumferential length of said entrance opening, a laterally extending scraper element on the lower extremity of said inclined wall and having a lower edge spaced above said curved clearance surfaces of said bridge members, means on the distributor forming cavities under said inclined wall at the rearward ends of said bridge members, whereby a flow of solid particles may pass between said bridge members and under said scraper element and laterally into said cavities.

4. The combination of claim 3 including resilient spreader means at the forward ends of said cavities.

5. In a rotary feeder of the type described, the combination of: a housing having an entrance opening and a discharge opening, a rotor mounted to turn in the housing and provided with radially extending blades, the blades defining pockets therebetween adapted to receive solid particles from the entrance opening and to discharge them by gravity through said discharge opening, a distributor having a bridge member positioned in the entrance opening and reducing the width thereof, said bridge member having curved lower surface for running clearance with respect to said rotor blades, a downward and forward inclined wall on said distributor contacting said bridge member and reducing the circumferential length of said entrance opening, a laterally extending scraper on the lower extremity of said inclined wall and having a lower edge spaced above said curved clearance surface of said bridge member, means forming a cavity under said inclined wall and at the rearward end of said bridge member, whereby a flow of solid particles may pass between said bridge members and under said scraper and laterally into said cavity.

6. In a rotary feeder of the type described, the combination of: a housing having an entrance opening and a discharge opening, a rotor mounted to turn in the housing and provided with radially extending blades, the blades defining pockets therebetween adapted to receive solid particles from the entrance opening and to discharge them by gravity through said discharge opening, a distributor having laterally spaced bridge members positioned in the entrance opening and reducing the width thereof, said bridge members having curved lower surfaces for running clearance with respect to said rotor blades, a downward and forward inclined wall on said distributor extending between said bridge members and reducing the circumferential length of said entrance opening, a laterally extending scraper on the lower extremity of said inclined wall and having a lower edge spaced above said curved clearance surfaces of said bridge members, the distributor having cavities under said inclined wall at the rearward ends of said bridge members, and angled edge surfaces on the distributor forward of said scraper, whereby a flow of solid particles may pass between said bridge members and under said scraper and laterally along said angled edge surfaces into said cavities.

7. For use in a rotary feeder of the type described, having a housing provided with an entrance opening and a discharge opening, a rotor mounted to turn in the housing and provided with radially extending blades, the entrance opening being larger than the maximum spacing of adjacent blades, the blades defining pockets therebetween adapted to receive solid particles from the entrance opening and to discharge them by gravity through said discharge opening, the improvement comprising, in combination: a distributor having laterally spaced bridge members positioned in the entrance opening and reducing the width thereof, said bridge members having curved lower surfaces for running clearance with respect to said rotor blades, said curved lower surfaces tapering from a relatively wide rearward end to a relatively narrow forward end, a downward and forward inclined wall on said distributor extending between said bridge members and reducing the circumferential length of said entrance opening, a laterally extending scraper on the lower extremity of said inclined wall and having a lower edge spaced above said curved clearance surfaces of said bridge members, means on the distributor forming cavities under said inclined wall at the rearward ends of said bridge members, whereby a flow of solid particles may pass between said bridge members and under said scraper and laterally into said cavities.

8. For use with a feeder having a housing provided with an entrance opening and a discharge opening and a member mounted to move in the housing and provided with laterally extending blades, the blades defining pockets therebetween adapted to receive solid particles from the entrance opening and to discharge them by gravity through said discharge opening, the improvement comprising, in combination: a distributor mounted in the entrance opening for controlling gravity flow of solid particles into said pockets, said distributor having laterally spaced bridge members provided with lower surfaces for running clearance with respect to said blades, said bridge members having downward extending inclined side walls forming the lateral boundaries of a feeding throat, a scraper on said distributor positioned between said side walls and having a lower edge spaced above said clearance surfaces of said bridge members, means including angled edge surfaces cooperating with the scraper and bridge members to define cavities in said distributor at the rearward ends of said bridge members, said angled edge surfaces serving to divide a flow of separate solid particles passing through said throat and under the scraper and to spread them laterally into said cavities.

9. For use with a rotary feeder having a housing provided with an entrance opening and a discharge opening and a rotor mounted to turn in the housing and provided with radially extending blades, the blades defining pockets therebetween adapted to receive solid particles from the entrance opening and to discharge them by gravity through said discharge opening, the improvement comprising, in combination: a distributor mounted in the entrance opening for controlling gravity flow of solid particles into said rotor pockets, said distributor having laterally spaced bridge members provided with lower curved surfaces for running clearance with respect to said rotor blades, said bridge members having downward extending inclined side walls forming the lateral boundaries of a feeding throat, a scraper on said distributor positioned between said side walls and having a lower edge spaced above said curved clearance surfaces of said bridge members, means including angled edge surfaces cooperating with the scraper and bridge members to define cavities in said distributor at the rearward ends of said bridge members, said angled edge surfaces serving to divide a flow of separate solid particles passing through said throat and under the scraper and to spread them laterally into said cavities.

10. For use with a rotary feeder having a housing provided with an entrance opening and a discharge opening and a rotor mounted to turn in the housing and provided with radially extending blades, the blades defining pockets therebetween adapted to receive solid particles from the entrance opening and to discharge them by gravity through said discharge opening, the improvement comprising, in combination: a distributor mounted in the entrance opening for controlling gravity flow of solid particles into said rotor pockets, said distributor having laterally spaced bridge members provided with lower curved surfaces for running clearance with respect to said rotor blades, said bridge members having downward extending inclined side walls forming the lateral boundaries of a feeding throat, a scraper on said distributor positioned between said side walls and having a lower edge spaced above said curved clearance surfaces of said bridge members, means including angled edge surfaces meeting at an apex rearward of said scraper and cooperating with the scraper and bridge members to define cavities in said distributor at the rearward ends of said bridge members, said angled edge surfaces serving to divide a flow of separate solid particles passing through said throat and under the scraper and to spread them laterally into said cavities.

11. For use with a rotary feeder having a housing provided with an entrance opening and a discharge opening and a rotor mounted to turn in the housing and provided with radially extending blades, the blades defining pockets therebetween adapted to receive solid particles from the entrance opening and to discharge them by gravity through said discharge opening, the improvement comprising, in combination: a distributor mounted in the entrance opening for controlling gravity flow of solid particles into said rotor pockets, said distributor having laterally spaced bridge members provided with lower curved surfaces for running clearance with respect to said rotor blades, said bridge members having downward extending inclined side walls forming the lateral boundaries of a feeding throat, the distributor having other walls defining the front and rear boundaries of said feeding throat, one of the latter said walls being inclined downward and forward and having a lower terminal portion positioned substantially above the lowermost portions of the said inclined side walls, a scraper on said distributor positioned below said terminal portion and having a lower edge spaced above said curved clearance surfaces of said bridge members, means including angled edge surfaces meeting at an apex rearward of said scraper and cooperating with the scraper and bridge members to define cavities in said distributor at the rearward ends of said bridge members, said angled resilient edge surfaces serving to divide a flow of separate solid particles passing through said throat and under the scraper and to spread them laterally into said cavities.

12. In a feeder of the type described, the combination of: a housing having an entrance opening and a discharge opening, a member mounted to move in the housing and provided with laterally extending blades, the blades defining pockets therebetween adapted to receive solid particles from the entrance opening and to discharge them by gravity through said discharge opening, a distributor having three laterally spaced bridge members positioned in the entrance opening defining two feeding throats therebetween, said bridge members having lower surfaces for running clearance with respect to said blades, a downward and forward inclined wall on said distributor extending between said bridge members, laterally extending scrapers on the lower extremity of said inclined wall extending between said bridge members and each having a lower edge spaced above said clearance surfaces of said bridge members, and means forming cavities under said inclined wall and at the rearward ends of said bridge members, whereby a flow of solid particles may pass between said bridge members and under said scrapers and into said cavities.

References Cited in the file of this patent
UNITED STATES PATENTS

| | | |
|---|---|---|
| 1,279,804 | Welcker | Sept. 24, 1918 |
| 2,268,725 | Steel | Jan. 6, 1942 |

FOREIGN PATENTS

| | | |
|---|---|---|
| 1,191,143 | France | Apr. 6, 1959 |